(12) United States Patent
Muhammad et al.

(10) Patent No.: US 11,479,304 B2
(45) Date of Patent: Oct. 25, 2022

(54) TUNABLE ENERGY ABSORBER

(71) Applicant: GM Global Technology Operations LLC, Detroit, MI (US)

(72) Inventors: Hanif Muhammad, Ann Arbor, MI (US); Louis G. Hector, Jr., Shelby Township, MI (US); Mark A. Beauregard, Clarkston, MI (US); Andrew C. Bobel, Troy, MI (US); Michael J. Sigelko, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 823 days.

(21) Appl. No.: 16/413,043

(22) Filed: May 15, 2019

(65) Prior Publication Data

US 2020/0361539 A1    Nov. 19, 2020

(51) Int. Cl.
| | | |
|---|---|---|
| *B32B 3/12* | (2006.01) | |
| *B62D 25/10* | (2006.01) | |
| *B62D 25/12* | (2006.01) | |
| *B32B 7/08* | (2019.01) | |
| *B60R 21/02* | (2006.01) | |
| *F16F 7/12* | (2006.01) | |
| *B60R 21/34* | (2011.01) | |
| *B60R 21/00* | (2006.01) | |

(52) U.S. Cl.
CPC .............. *B62D 25/105* (2013.01); *B32B 7/08* (2013.01); *B60R 21/02* (2013.01); *B62D 25/12* (2013.01); *F16F 7/121* (2013.01); *B32B 2605/00* (2013.01); *B60R 2021/0004* (2013.01); *B60R 2021/343* (2013.01); *F16F 7/12* (2013.01)

(58) Field of Classification Search
CPC ........ B62D 25/105; B62D 25/12; B32B 7/08; B32B 2605/00; B60R 2021/0004; B60R 21/02; B60R 2021/343; F16F 7/12
See application file for complete search history.

(56) References Cited

U.S. PATENT DOCUMENTS

| | | | | |
|---|---|---|---|---|
| 2009/0025995 | A1* | 1/2009 | Wang | B62D 25/105 180/69.2 |
| 2010/0019540 | A1* | 1/2010 | Fujimoto | B62D 25/105 296/193.11 |
| 2017/0188650 | A1* | 7/2017 | Hector, Jr. | B32B 9/041 |
| 2021/0163073 | A1* | 6/2021 | Renegar | F16F 7/121 |

* cited by examiner

*Primary Examiner* — Mary I Omori
(74) *Attorney, Agent, or Firm* — Quinn IP Law

(57) ABSTRACT

An energy absorber for interposition between a cover and a covered object includes a generally planar matrix of cells. Each of the cells includes a plurality of generally elongate micro-elements interconnected to form a cell micro-structure, with each cell having a respective energy absorption capacity such that an energy absorption capacity of the energy absorber varies across at least one direction. The cells are configured such that impulse of an object with the cover with the energy absorber sandwiched between the cover and the covered object causes a deceleration vs. time response in the object, beginning with a generally linear rise in the deceleration to a peak deceleration within 5 ms after the beginning of the impulse event, followed by a generally nonlinear decrease in the deceleration over a period of not greater than 15 ms to a final target deceleration of not greater than 10% of the peak deceleration.

17 Claims, 10 Drawing Sheets

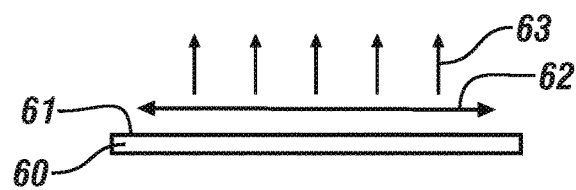
FIG. 8-1    FIG. 8-2
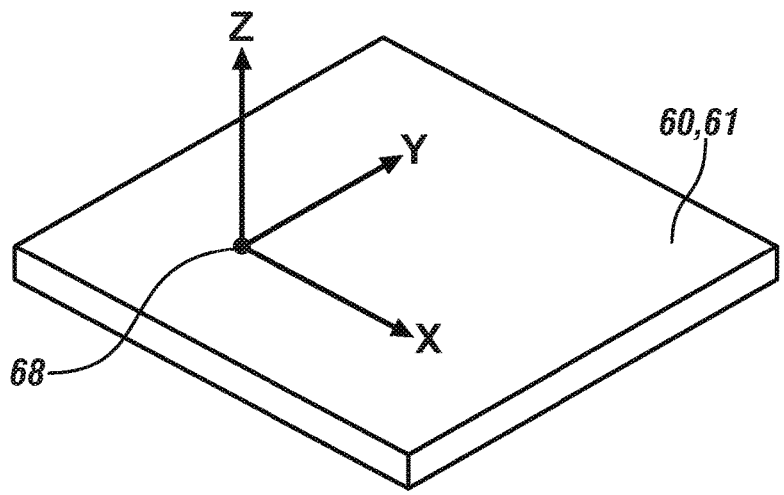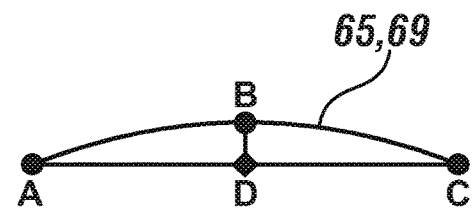
FIG. 8-3    FIG. 8-4
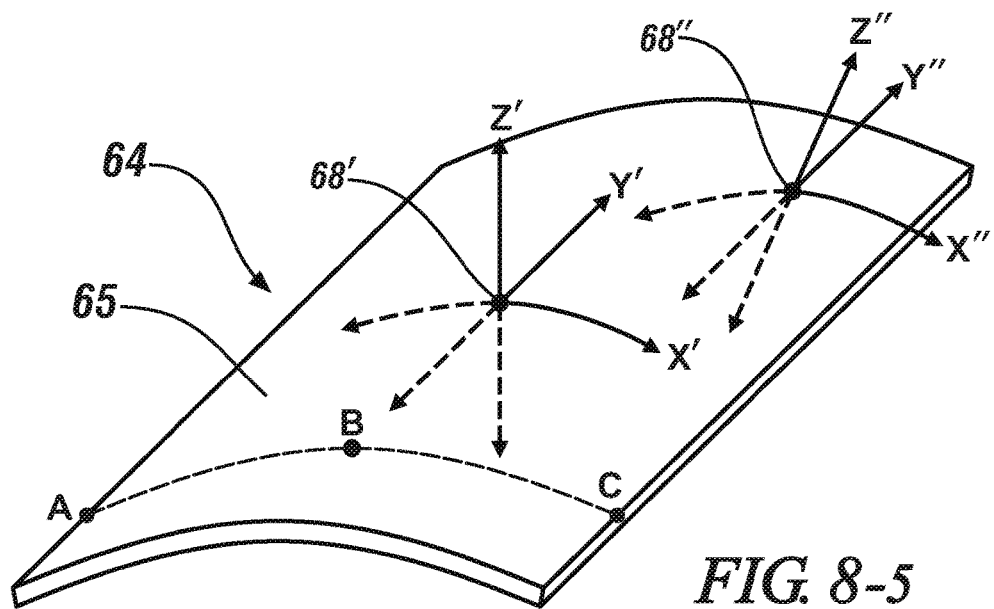
FIG. 8-5

TUNABLE ENERGY ABSORBER

INTRODUCTION

This disclosure generally relates to articles and methods for tunable energy absorption, such as for mitigating the effects of impulse events.

Some automobiles and other vehicles have a hood or bonnet, which is the hinged cover that allows access to the engine compartment for maintenance and repair. In many vehicles, but not all vehicles, the hood or bonnet is on the front of the vehicle, relative to the forward direction of travel.

The hood structure of a vehicle plays a role in managing how energy is absorbed or dissipated when there is contact between the vehicle and an object, such as when an object impulses the vehicle hood. During such an impulse event, the vehicle hood must absorb or dissipate a significant amount of energy over a small area while precluding impulse with a hard engine compartment component as the hood is pushed into the engine compartment. As modern vehicles are very densely packaged under the hood, various hard parts, such as hood hinges, bump stoppers, air inlet panels, inlet splash panels, airboxes, shock towers, etc., are located very close to the underside of the hood.

Accordingly, there is a need for an approach that decreases the severity of impulses experienced by objects when colliding with vehicle hoods and other exterior parts or panels.

SUMMARY

According to one embodiment, an energy absorber for interposition between a cover and a covered object includes a generally planar matrix of cells, the matrix defining in-plane and out-of-plane directions. Each cell includes a respective plurality of generally elongate micro-elements interconnected to form a respective cell micro-structure. Each cell has a respective energy absorption capacity wherein an energy absorption capacity of the energy absorber varies across at least one of the in-plane and out-of-plane directions. The cells are configured such that impulse of an object with the cover with the energy absorber sandwiched between the cover and the covered object, thereby defining an impulse event, causes a deceleration vs. time response in the object, beginning with a generally linear rise in the deceleration from an initial deceleration at a beginning of the impulse event to a peak deceleration within 5 milliseconds (ms) after the beginning of the impulse event, followed by a generally nonlinear decrease in the deceleration over a period of not greater than 15 ms to a final target deceleration of not greater than 10% of the peak deceleration.

Each micro-element has a respective micro-element configuration including a respective length, overall thickness, shape, material composition, density and porosity of the respective micro-element, wherein the micro-element configurations may vary across at least one of the in-plane and out-of-plane directions. The material composition may include at least one of a metal alloy, a polymer and a ceramic, and at least one of the material composition, density and porosity of a respective micro-element may vary along the length of the micro-element.

Each cell micro-structure may be disposed in one of a first arrangement and a second arrangement. In the first arrangement, each micro-element therein may be a generally elongate pillar member each having a respective base end and free end. The first arrangement further includes a generally planar substrate having opposed first and second generally planar surfaces, wherein the base end of each pillar member is contiguous with the first generally planar surface of the substrate. The first arrangement may further include at least one cross-member connected with at least two pillar respective members. The second arrangement may be a 3D lattice wherein each micro-element therein may be a generally elongate truss member each having a respective first end and second end, wherein each respective truss member may be directly connected to at least one other respective truss member. In the second arrangement, each truss member therein may have at least one respective connection locus, each connection locus being located at a respective one of the first end, the second end and a point between the first and second ends. Each truss member therein may be connected at each of its respective at least one connection locus to at least one other respective truss member.

Each micro-element may be generally solid and may have a porosity between 0% and 40% by volume. For each cell, the plurality of micro-elements therein may have a volume which is 20-60% of the cell volume. The covered object may have a generally planar face and at least one of a hardness, stiffness, elastoplasticity and surface geometry of the covered object may vary across the face of the covered object.

One embodiment includes a tuned energy absorber for interposition between a cover and a covered object, the covered object having a generally planar face defining a first matrix of cells each having a respective hardness, stiffness, elastoplasticity and surface geometry wherein at least one of the hardness, stiffness, elastoplasticity and surface geometry varies across the generally planar face. The energy absorber includes a generally planar second matrix of cells corresponding to the first matrix of cells, the second matrix defining in-plane and out-of-plane directions. Each cell of the second matrix of cells includes a respective plurality of generally elongate, generally solid micro-elements interconnected to form a respective cell micro-structure. Each cell of the second matrix of cells may have a respective energy absorption capacity wherein an energy absorption capacity of the energy absorber varies across at least one of the in-plane and out-of-plane directions. The generally planar second matrix of cells may be configured such that impulse of an object with the cover with the energy absorber sandwiched between the cover and the covered object, thereby defining an impulse event, causes a deceleration vs. time response in the object, beginning with a generally linear rise in the deceleration from an initial deceleration at a beginning of the impulse event to a peak deceleration within 5 ms after the beginning of the impulse event, followed by a generally nonlinear decrease in the deceleration over a period of not greater than 15 ms to a final target deceleration of not greater than 10% of the peak deceleration.

Each micro-element may have a respective micro-element configuration including a respective length, overall thickness, shape, material composition, density and porosity of the respective micro-element, wherein the micro-element configurations vary across at least one of the in-plane and out-of-plane directions. Each cell micro-structure may be disposed in one of a first arrangement and a second arrangement. In the first arrangement, each micro-element therein may be a generally elongate pillar member each having a respective base end and free end. The first arrangement further includes a generally planar substrate having opposed first and second generally planar surfaces, wherein the base end of each pillar member is contiguous with the first generally planar surface of the substrate. The first arrangement may further include at least one cross-member connected with at least two respective pillar members. The second arrangement may be a 3D lattice wherein each micro-element therein may be a generally elongate truss member each having a respective first end and second end, wherein each respective truss member is directly connected to at least one other respective truss member. In the second arrangement, each truss member therein may have at least one respective connection locus, each connection locus being located at a respective one of the first end, the second end and a point between the first and second ends, each truss member therein being connected at each of its respective at least one connection locus to at least one other respective truss member.

One embodiment includes an energy absorber system, including: (i) a covered object having a generally planar face defining a first matrix of cells each having a respective hardness, stiffness, elastoplasticity and surface geometry, wherein at least one of the hardness, stiffness, elastoplasticity and surface geometry varies across the generally planar face; (ii) a cover spaced apart from and covering the generally planar face of the covered object; and (ii) an energy absorber interposed between the cover and the covered object. The energy absorber includes a generally planar second matrix of cells corresponding to the first matrix of cells, the second matrix defining in-plane and out-of-plane directions. Each cell of the second matrix of cells includes a respective plurality of generally elongate micro-elements interconnected to form a respective cell micro-structure. Each cell of the second matrix of cells has a respective energy absorption capacity wherein an energy absorption capacity of the energy absorber varies across at least one of the in-plane and out-of-plane directions.

The generally planar second matrix of cells may be configured such that impulse of an object with the cover with the energy absorber sandwiched between the cover and the covered object, thereby defining an impulse event, causes a deceleration vs. time response in the object, beginning with a generally linear rise in the deceleration from an initial deceleration at a beginning of the impulse event to a peak deceleration within 5 ms after the beginning of the impulse event, followed by a generally nonlinear decrease in the deceleration over a period of not greater than 15 ms to a final target deceleration of not greater than 10% of the peak deceleration.

Each micro-element may have a respective micro-element configuration including a respective length, overall thickness, shape, material composition, density and porosity of the respective micro-element, wherein the micro-element configurations vary across at least one of the in-plane and out-of-plane directions. At least one of the material composition, density and porosity of a respective micro-element may vary along the length of the micro-element. Each micro-element may be generally solid and have a porosity between 0% and 40% by volume.

Each cell micro-structure may be disposed in one of a first arrangement and a second arrangement. In a first arrangement, each micro-element therein may be a generally elongate pillar member having a respective base end and free end. The first arrangement further includes a generally planar substrate having opposed first and second generally planar surfaces, wherein the base end of each pillar member is contiguous with the first generally planar surface of the substrate. The second arrangement may be a 3D lattice wherein each micro-element therein may be a generally elongate truss member having a respective first end and second end, wherein each respective truss member is directly connected to at least one other respective truss member. The first arrangement may further include at least one cross-member connected with at least two respective pillar members. In the second arrangement, each truss member therein may have at least one respective connection locus, each connection locus being located at a respective one of the first end, the second end and a point between the first and second ends, each truss member therein being connected at each of its respective at least one connection locus to at least one other respective truss member.

BRIEF DESCRIPTION OF THE DRAWINGS

FIGS. 5-1 and 5-2 show alternative schematic views of a cover, covered object and energy absorber according to an embodiment of the disclosure.

FIGS. 8-1 and 8-2 show schematic side views of flat and curved planar members, respectively, according to an embodiment of the disclosure.

FIG. 8-3 shows a schematic perspective view of a flat planar member according to an embodiment of the disclosure.

FIG. 8-4 shows a schematic side view representation of the curvature of a curved planar member according to an embodiment of the disclosure.

FIG. 8-5 shows a schematic perspective view of a curved planar member according to an embodiment of the disclosure.

FIG. 9-1 shows a schematic perspective view of a covered object according to an embodiment of the disclosure.

FIG. 9-2 is an alternative rendering of FIG. 9-1 to show a generally planar face of the covered object according to an embodiment of the disclosure.

FIG. 9-3 shows a schematic perspective view of a first matrix of cells corresponding to the covered object of FIGS. 9-1 and 9-2 according to an embodiment of the disclosure.

FIGS. 14-1 and 14-2 show side and cross-sectional views, respectively, of two micro-elements according to an embodiment of the disclosure.

FIGS. 15-1 and 15-2 show side and top views, respectively, of two micro-elements and a cross-member according to an embodiment of the disclosure.

FIGS. 16-1 and 16-2 show side and top views, respectively, of three micro-elements and a cross-member according to an embodiment of the disclosure.

FIGS. 17-1, 17-2 and 17-3 show perspective views of pillar member micro-elements according to an embodiment of the disclosure.

FIGS. 19-1 and 19-2 show schematic perspective views of cells utilizing truss members and pillar members, respectively, according to an embodiment of the disclosure.

Note that some of the drawings herein are subdivided into multiple related views, with all the related views sharing a common "root" figure number and each individual view having its own unique "dash" figure number. For example, FIGS. 5-1 and 5-2 are alternative schematic views of a cover, covered object and energy absorber according to an embodiment of the disclosure; both related views share the same "root" number (i.e., 5), and each individual view has its own unique "dash" number (i.e., -1 and -2). When drawings are subdivided in this way, reference may be made herein to the "root" figure number alone to refer collectively to all the associated "dash" numbers; thus, "FIG. 5" refers to FIGS. 5-1 and 5-2 collectively. Likewise, "FIG. 8" refers to FIGS. 8-1 through 8-5 collectively.

DETAILED DESCRIPTION

Figure 1:
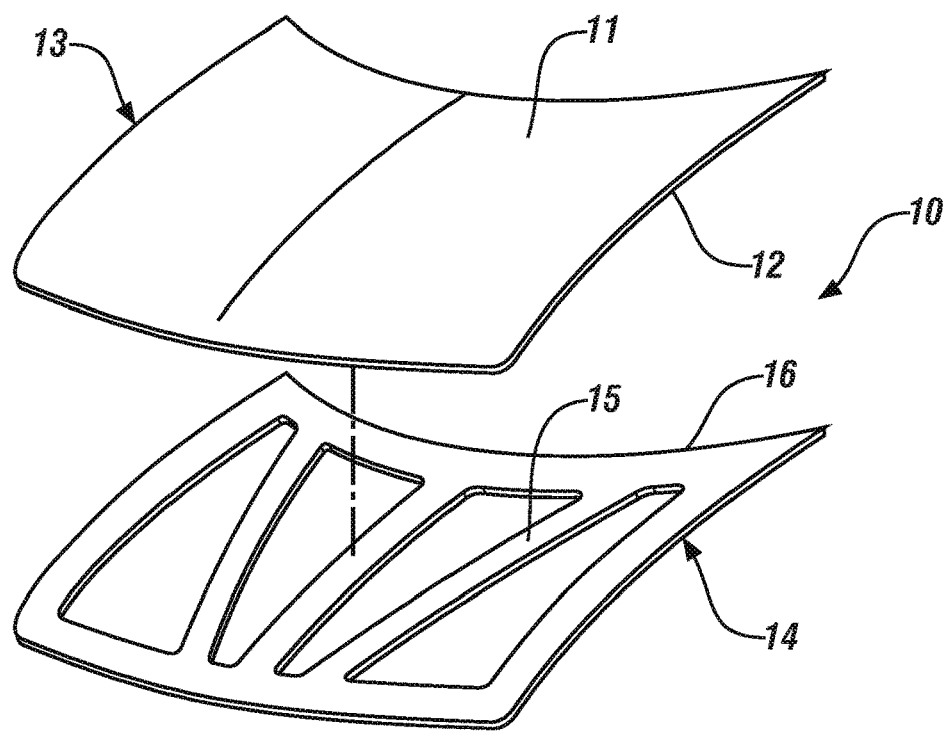
FIG. 1 is a semi-schematic, perspective exploded view of a hood inner panel and a hood outer panel for an automotive vehicle according to an embodiment of the disclosure.

Referring now to the drawings, wherein like numerals indicate like parts in the several views, a tunable energy absorber is shown and described herein in multiple embodiments.

FIG. 1 is a semi-schematic exploded view of a vehicle hood 10 which may be used to cover the engine compartment at the front end of an automotive vehicle. The hood 10 is typically made of an upper panel 11 and a corresponding lower panel 14. The upper panel 11 has opposed front and rear edges, and opposed side edges 12, 13. The lower panel 14 has edges which correspond to those of the upper panel 11, including a rear edge 16 which is near the windshield or windscreen of the vehicle when the hood 10 is installed. The lower panel 14 may also have one or more supporting rib structures 15 with gaps or spaces therebetween.

While the present disclosure is described in detail with respect to automotive applications, those skilled in the art will recognize the broader applicability of the technology to include non-automotive applications as well. Those having ordinary skill in the art will recognize that terms such as "above," "below," "upper," "lower," etc., are used descriptively of the figures, and of objects and their relative locations and orientations with respect to other objects in the figures, and do not represent limitations on the scope of the present disclosure. For example, in FIG. 1, the upper panel 11 of the hood 10 appears to be above the lower panel 14, and in the normal manner in which hoods 10 are installed onto vehicles, the upper panel 11 would in fact be disposed above the lower panel 14; but if the hood 10 were flipped upside-down, the upper panel 11 would then be disposed below the lower panel 14 while the hood 10 is in that upside-down orientation.

Figure 2:
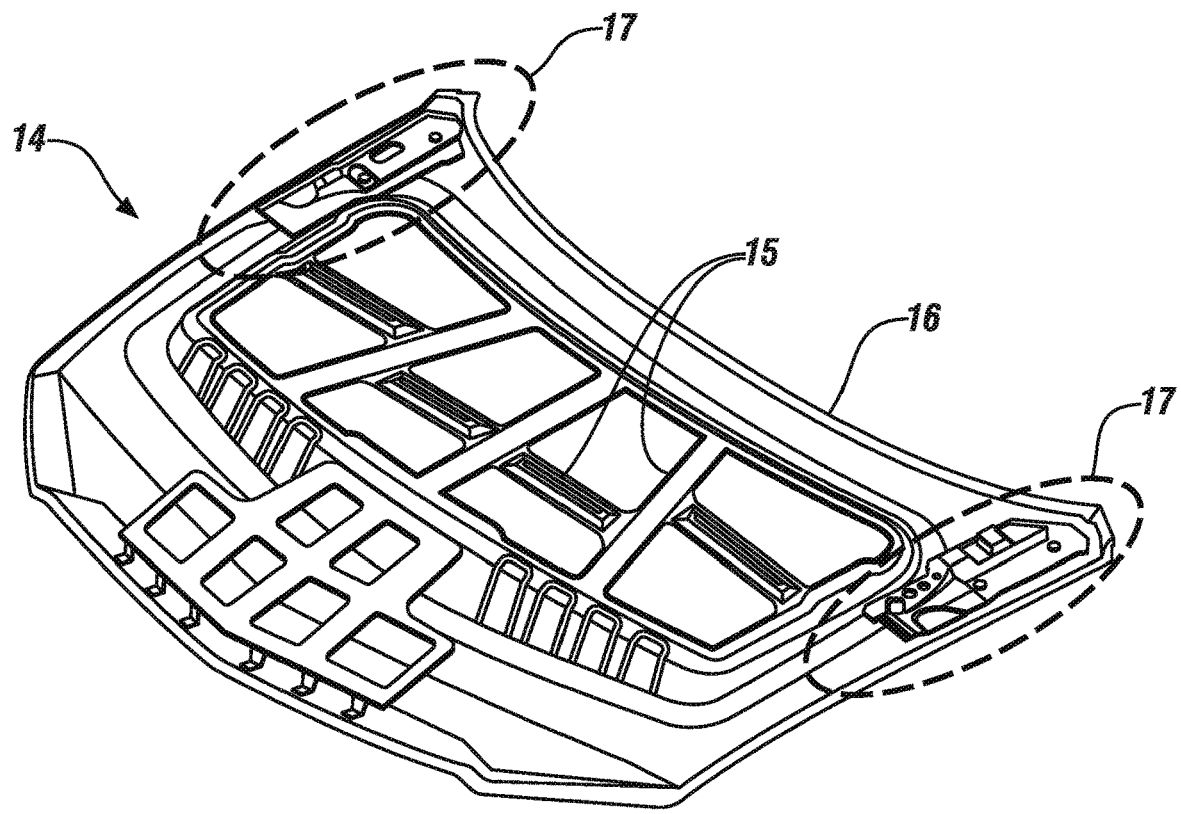
FIG. 2 is a top perspective view of a hood inner panel with hood hinge reinforcements according to an embodiment of the disclosure.
Figure 3:
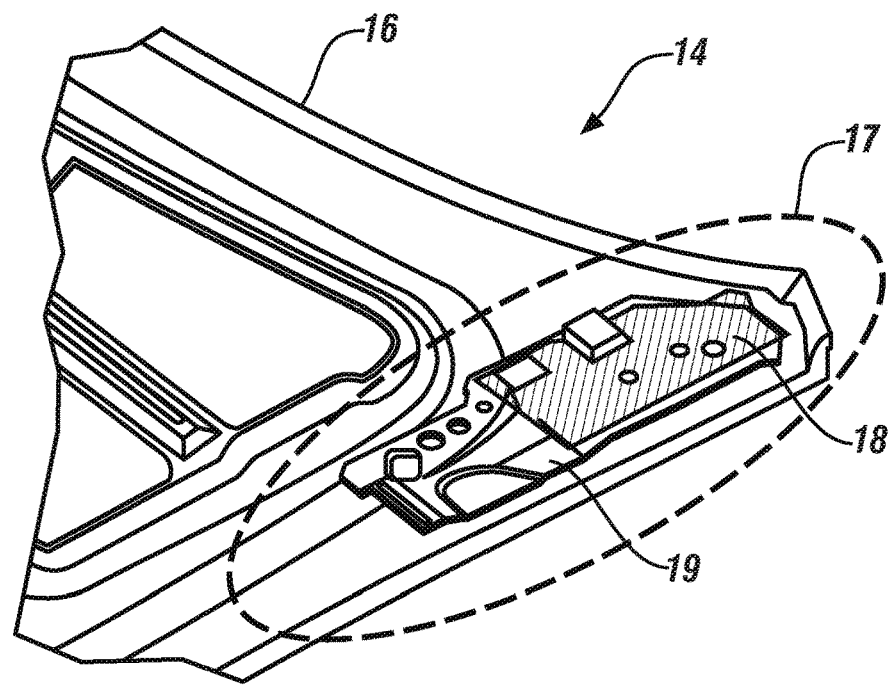
FIG. 3 is a close-up perspective view of a hood inner panel and two alternative hood hinge reinforcements according to an embodiment of the disclosure.

FIGS. 2 and 3 show a more detailed view of the lower panel 14. Note that there are two areas 17 indicated by the dashed ellipses at the two corners adjacent to the rear/windshield edge 16 where hood hinge reinforcements or plates 18, 19 are located. These reinforcements 18, 19 may be added to the lower panel 14 to structurally reinforce the lower panel 14 in these areas 17 where the hood hinge assembly 20 is attached to the hood 10. FIG. 3 shows two different hood hinge reinforcements 18, 19 for the sake of comparison, but in practice typically one or the other would be used. While the hinge reinforcement 18, 19 is shown in FIGS. 2 and 3 as being attached to the lower panel 14, it may be attached to the upper panel 11, the lower panel 14 or both panels 11, 14. The method of attachment may include weldments, rivets, adhesives or the like.

Figure 4:
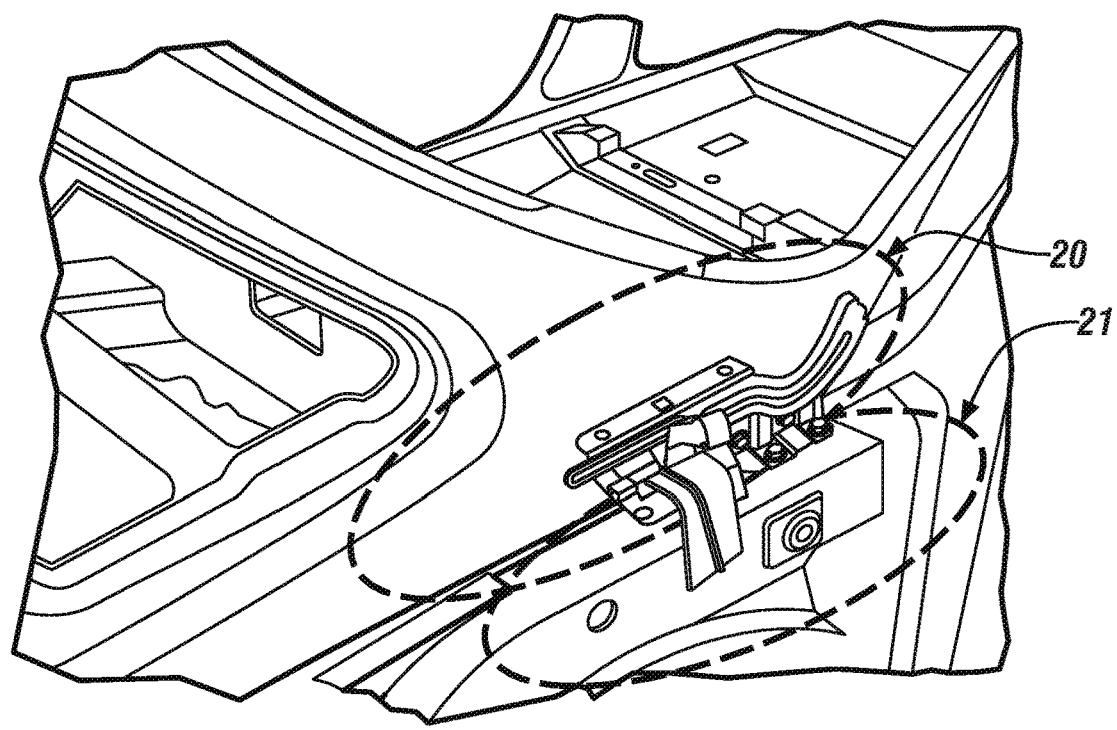
FIG. 4 is a close-up perspective view of a hood hinge area according to an embodiment of the disclosure.

FIG. 4 shows the hood hinge assembly area 20 located at a top rearward corner area of the engine compartment, and a body structural member area 21 located near the hood hinge assembly area 20 on the side of the vehicle outside of the engine compartment. The hood hinge assembly area 20 would be covered by the hood 10, and the body structural member area 21 would be covered by a fender or quarter-panel (not shown). Covers such as the hood 10 and fender/quarter-panel serve to cover the underlying hood hinge assembly area 20 and body structural member area 21 which contain hard or rigid objects, such as the hood hinge assembly and the body structural members. The terms "hard" and "rigid" as used herein are not used in an absolute sense, but describe objects that are relatively hard and rigid compared to other objects. Objects that are "hard" or "rigid" may be relatively heavy and/or stationary, and may provide a reactive force to an impulsing object and significantly contribute to damage during collisions. As used herein, the terms "hard" and "rigid" are used interchangeably. In addition to hood hinge assemblies and body structural members, other examples of hard or rigid objects in an automotive environment include an engine, a battery, a supercharger, a sway bar, a shock tower, a strut housing, and a radiator and radiator cap, or other objects lying in closer proximity to the underside of the hood 10 or cover than other components.

As mentioned above, the hood 10 structure of a vehicle plays a role in managing how energy is absorbed or dissipated when there is contact between the vehicle and an object, such as when an obstacle or pedestrian impulses the vehicle hood. During such an impulse event, the vehicle hood 10 must absorb or dissipate a significant amount of energy over a small area while precluding impulse with underlying hard objects as the hood 10 is pushed into the engine compartment. As modern vehicles are very densely packaged under the hood, various hard parts, such as hood hinge assemblies and shock towers, are located very close to the underside of the hood 10. A similar situation applies to other covers, such as fenders and quarter-panels which cover underlying hard objects such as body or frame support members, when side impulses occur.

Figures 1, 5:
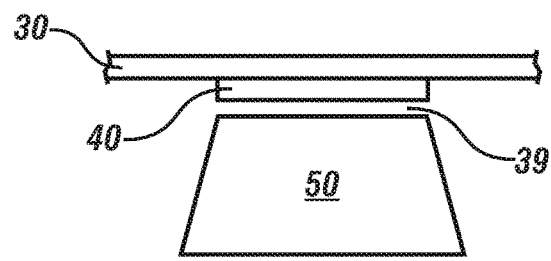
Figures 2, 5:
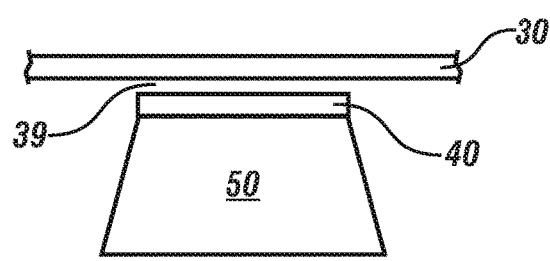

FIGS. 5-1 and 5-2 show two alternative schematic views of a tunable energy absorber 40 which may be interposed between a cover 30 and a covered object 50. For example, the covered object 50 may be a hood hinge assembly (which is relatively hard and rigid) and the cover 30 may be a vehicle hood 10. As shown in FIG. 5-1, the energy absorber 40 may be attached to the underside of the cover 30 facing the covered object 50, with a gap 39 between the energy absorber 40 and the covered object 50. Alternatively, as shown in FIG. 5-2, the energy absorber 40 may be attached to the top side of the covered object 50 facing the cover 30, with a gap 39 between the energy absorber 40 and the cover 30.

Figure 6:
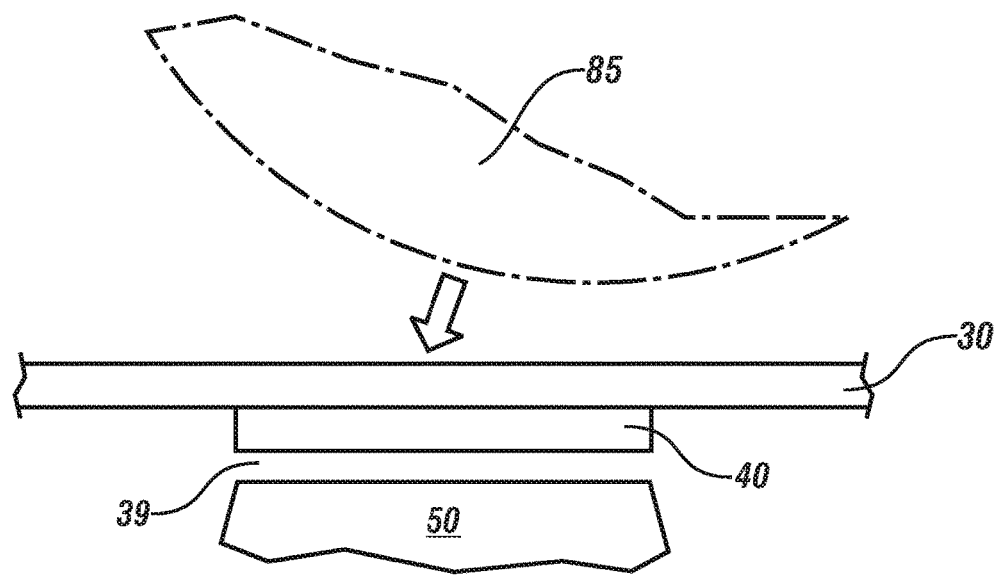
FIG. 6 shows a schematic view of a cover, covered object, energy absorber and impulsing object according to an embodiment of the disclosure.

As shown in FIG. 6, the tunable energy absorber 40 is configured to absorb energy delivered by an impulse load to the outer surface of the cover 30, such as from an impulsing object 85, when the energy absorber 40 is interposed between the cover 30 and the covered object 50. In FIG. 6, the impulse load is represented as an arrow, and is merely illustrative. The direction and type of impulse may vary and the impulsing object 85 causing the impulse load may vary. (Also note that while FIG. 6 shows a configuration similar to FIG. 5-1 where the energy absorber 40 is attached to the cover 30 and a gap 39 is shown between the energy absorber 40 and the covered object 50, the configuration may alternatively be similar to FIG. 5-2 where the energy absorber 40 is attached to the covered object 50 and a gap 39 may be between the cover 30 and the energy absorber 40. Alternatively, there may be no gap 39 between the energy absorber 40 and either the cover 30 or the covered object 50.)

If the energy absorber 40 were not disposed between the cover 30 and the covered object 50, the impulse load from the colliding object 85 may cause the cover 30 to deform until the cover 30 crosses the gap 39 (if any) and makes contact with the covered object 50. However, the energy absorber 40 may begin deforming and dissipating energy from the impulse load before the cover 30 makes contact with the covered object 50, thereby reducing the force transmitted to the impulsing object 85 from the covered object 50. The way in which the tunable energy absorber 40 dissipates the impulse load may be quantified using Eq. 1 below, which is the equation for the Head Injury Criteria (HIC) score. It is to be understood that Eq. 1 is an example, and is not the sole way to quantify the effect of the energy absorber of the present disclosure. For example, evaluation of tunable energy absorbers 50 disclosed herein may include a rotational component (e.g., a rotational correction to the deceleration term a(t)) in addition to the linear dimension evaluated in Eq. 1. Without the energy absorber 40, the peak loads experienced by the impulsing object 85 are higher and less energy is absorbed (by the cover 30) as the impulsing object 85 passes through the gap 39 with the cover 30 between the impulsing object 85 and the covered object 50.

$$HIC = \max_{(t1,t2)} \left[ (t2-t1)\left(\frac{1}{(t2-t1)}\int_{t2}^{t1} a(t)dt\right)^{2.5} \right] \quad \text{Eq. 1}$$

In Eq. 1, t1 and t2 are the initial and final times (in seconds) of a time interval during which Eq. 1 attains a maximum value, and deceleration a is in units of gs (1 standard g=9.81 meters per second squared). The maximum time duration (t2-t1) may be limited to a specific value ranging from about 3 ms to about 36 ms (milliseconds). For example, the maximum time duration may be about 20 ms.

In experimental tests, Eq. 1 is evaluated from the deceleration and time history of at least one accelerometer mounted at the center of gravity of the impulsing object 85 when the object 85 is impulsed into cover 30, such as a vehicle hood 10. Eq. 1 evaluates the effects of the deceleration on the impulsing object 85 and the duration time of the deceleration. In some computer models that predict a value of Eq. 1 for an impulse scenario, higher scores result from either short impulse duration times at larger maximum decelerations, or longer impulse duration times at smaller maximum decelerations. For a given gap measurement 39, the energy absorber 40 of the present disclosure is to minimize or reduce the magnitude of the HIC score from Eq. 1 for a particular impulse scenario. Alternatively, the energy absorber 40 may achieve a target score of Eq. 1 for a particular impulse scenario while minimizing the gap measurement 39. (One skilled in the art would understand that the terms "deceleration" and "resultant acceleration" are used interchangeably with the two differing by a multiplicative factor of −1. In other words, the deceleration of the object 85 means that the minus sign on the acceleration is ignored.)

The HIC score (i.e., the left-hand side of Eq. 1), which is calculated from a deceleration vs. time waveform at impulse, is typically used to evaluate protection performance during a collision with a hood 10. A hood structure 10 with a low HIC score is desirable. In the SAE Technical Paper Series, 2007-01-0759, "Optimization of Head Impulse Waveform to Minimize HIC", presented Apr. 16-19, 2007, pp. 1-12, J. P. Wu and B. Beaudet proposed a deceleration vs. time profile (which is indicative of the deceleration of an impulsing object 85 such as a head form) as the target for pedestrian head impulse to achieve a HIC score of 1000 or less. However, the authors did not provide hood 10 designs that could result in such a performance.

The deceleration vs. time profile with respect to an impulsing object 85, when the object 85 collides with an area of the hood 10 or cover 30 that is positioned above a hard object 50, is such that a first portion of the profile is generated when the impulsing object 85 contacts the outer surface of the cover 30 at the onset of the collision. Then, a second portion of the profile is generated when the cover 30 portion that contacts with the impulse object 85 during impulse moves downward and contacts hard internal parts 50 arranged underneath the cover 30 or hood 10.

Thus, it is desirable to provide a vehicle hood/cover assembly 10, 30 which is able to safely decelerate, in a given, limited distance an impulse object 85 when it impulse the vehicle hood/cover assembly 10, 30. To do so, the assembly 10, 30 should absorb a significant percentage of the impulse energy transferred by the impulse object 85. This is accomplished by providing the vehicle hood/cover assembly 10, 30 with an appropriate energy absorber 40 to substantially absorb the energy of the impulsing object 85.

The tunable energy absorber 40 of the present disclosure can be configured to reduce the HIC scores at the locations of various objects 50 under the vehicle hood 10 or cover 30 during an impulse with the vehicle hood/cover assembly 10, 30. The energy absorber 40 is described herein as being "tunable" or "tuned" because various mechanical, material, geometric and other characteristics of the energy absorber 40 may be manipulated and designed to "tune" the energy absorber 40 to achieve a desired response, which will be discussed further below. Thus, the mechanical, material, geometrical and other properties of the energy absorber 40 can be tuned or selected for a specific covered object 50 and/or location in a vehicle to achieve, for example, a HIC score of 1000 or less via plastic deformation and fracture of the absorber 40 as the absorber 40 receives the impulse load from the object 85 during the impulse.

Figure 7:
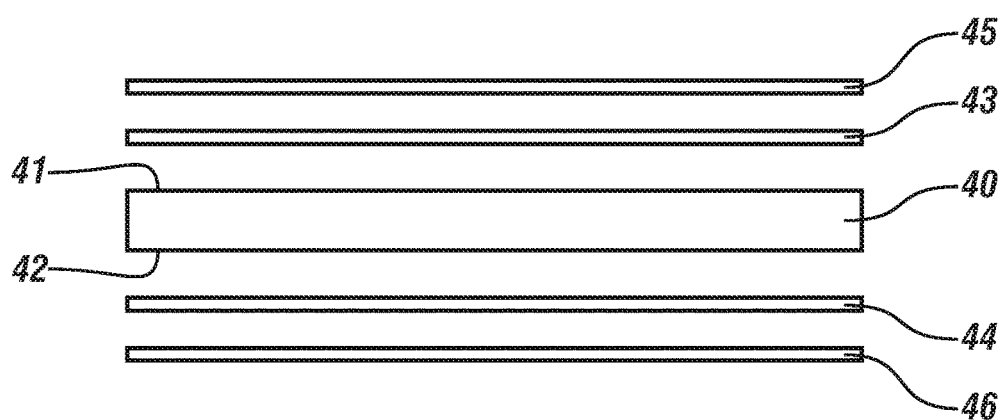
FIG. 7 shows an exploded schematic side view of an energy absorber according to an embodiment of the disclosure.

As shown in FIG. 7, the energy absorber 40, which has a first or "top" surface 41 and an opposed second or "bottom" surface 42, may optionally include a first support layer 45 attached to the first/top surface 41 by a first adhesive layer 43, and a second support layer 46 attached to the second/bottom surface 42 by a second adhesive layer 44. As indicated by FIGS. 5 through 8, the energy absorber 40 may be generally planar in shape. Using the X-Y-Z three-dimensional (3D) coordinate system shown at point 68 on surface 61 of the generally flat object 60 in FIG. 8-3 as an example, where the X, Y and Z axes are mutually orthogonal to each other, an object 60 may be described as "planar" when its X and Y dimensions are both much larger than its Z dimension. In other words, the Z dimension of the object 60 (i.e., the object's thickness and/or the amount its surfaces extend in the Z direction) is relatively "thin" compared to the X and Y dimensions of the object 60. Also, while a "planar" object 60 may lie in a flat plane as illustrated in FIG. 8-1, it may also lie in a curved plane as illustrated by the object 64 in FIGS. 8-2 and 8-5. Such a planar object 64 may curve about one or more axes; i.e., it may be curviplanar. (As used in this disclosure, "planar" includes "curviplanar", and "generally planar" includes "generally curviplanar". Note that while the flat object 60 of FIG. 8-3 is oriented such that the X-Y-Z coordinate system at point 68 has the Z direction pointing "up", other objects may be shaped and/or oriented differently from object 60, and the corresponding coordinate system at various points on the object may be oriented differently as well. For flat objects 60, the X, Y and Z axes may point in straight lines, while for curved objects 64 one or more of the X, Y and Z axes may point along curved lines. For example, for the curviplanar object 64 shown in FIG. 8-5, the X direction points in a curved line following the curved contour of the surface 65 of the object 64. Points 68' and 68" both have their respective Y axes (Y' and Y") pointing in straight lines parallel to each other, while their respective X axes (X' and X") are pointing in curved lines that are parallel to each other, and their respective Z axes (Z' and Z") are pointing in straight lines that are not parallel to each other (but which are locally normal to the surface 65 at the respective points 68' and 68"). For purposes of illustration, objects shown in the drawings may be described herein as having X and Y directions lying on a flat or curved surface or in a flat or curved plane that corresponds with the flat or curved overall shape of the object, and having a Z direction which points "outward" from such flat or curved surface or plane.)

The planar object 60, 64 has a surface 61, 65 (and/or a plane parallel with or corresponding to the surface 61, 65) which defines one or more in-plane or transverse directions 62, 66 and one or more out-of-plane directions 63, 67. One particular type of out-of-plane direction 63, 67 would be a direction that is normal to the surface 61, 65 of the object 60, 64. Because planar object 60 in FIGS. 8-1 and 8-3 is flat, the in-plane or transverse directions 62 would lie in an X-Y plane corresponding to the surface 61 (or parallel to the surface 61), and the normal direction 63 would lie in a Z direction that is orthogonal to both the X and Y directions for every point on the object 60. In contrast, the curved planar object 64 of FIGS. 8-2 and 8-5 has a curved surface 65, and the in-plane or transverse directions 66 would lie along this curved surface 65 as described above, with the Z direction pointing outward in different directions as described above. FIG. 8-4 shows a schematic side view representation of the curvature of a curved planar object 64, similar to that shown in FIGS. 8-2 and 8-5. Points A and C represent points on the surface 65 at opposed edges of the curved planar object 64, and point B lies on the surface 65 along arc ABC. Line segment ADC represents the straight-line distance between the edges of the object 64 along which points A and C lie, and line segment BD represents an amount by which the arc ABC or curved surface 65 deviates from being perfectly flat. (Note that alternatively, points A, B and C could lie on the bottom or underside surface 69 of the curviplanar object 64.) For purposes of this disclosure, the amount of curvature present in a curved planar object 64 such as shown in FIGS. 8-2, 8-3 and 8-5 may be such that the amount of curvature in the Z direction (e.g., length BD) is less than 10% of the smaller of the X and Y dimensions of the object 64 (e.g., length ADC). Note that although the size of the X and Y dimensions (e.g., length and width) of the object 60 in FIG. 8-3 appear to be about equal, a planar object 60 may have X and Y dimensions that are very different from one another; however, both dimensions would be larger than the Z dimension (e.g., the thickness of the object 60). Also note that while the surfaces 61, 65, 69 of the planar object 60, 64 are shown as being smooth in the drawings, the surfaces 61, 65, 69 may undulate and/or have outcroppings and indentations that cause the surfaces 61, 65, 69 to deviate from being smooth.

Figures 1, 9:
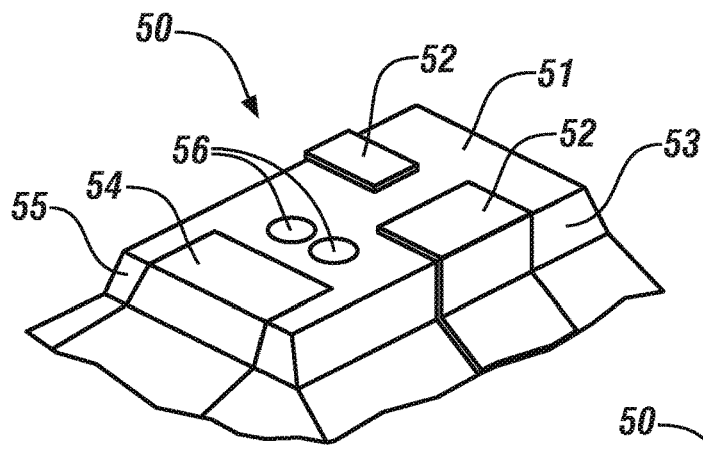
Figures 2, 9:
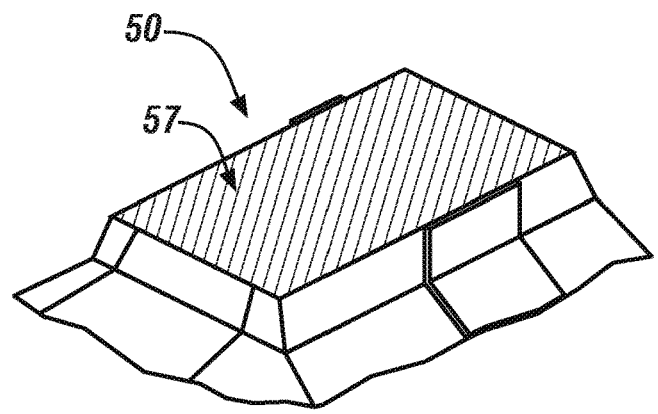
Figures 3, 9:
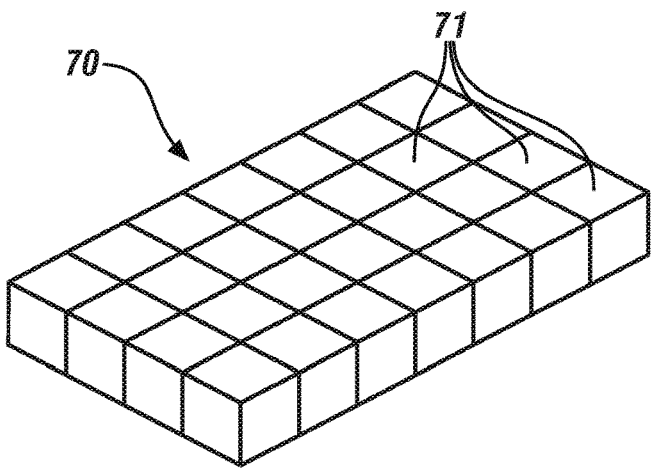
Figure 10:
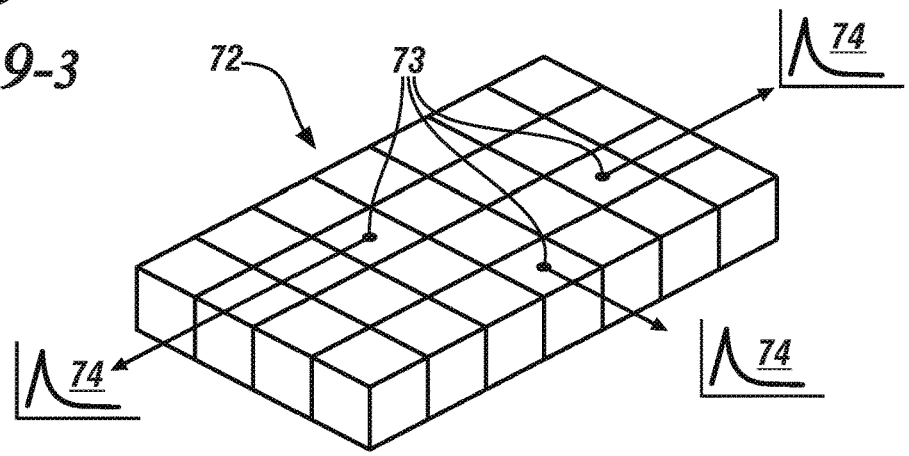
FIG. 10 shows a schematic perspective view of a second matrix of cells for an energy absorber corresponding to the first matrix of cells shown in FIG. 9-3 according to an embodiment of the disclosure.

The generally planar-shaped energy absorber 40 may be visualized as a generally planar matrix 72 of cells 73, as shown in FIG. 10. This planar matrix 72 or collection of cells 73 defines in-plane and out-of-plane directions, similar to the illustrations of FIGS. 8-3 and 8-5. As mentioned above, the energy absorber 40 is tunable, in that various mechanical, material, geometric and other characteristics of the energy absorber 40 may be manipulated and designed to "tune" the energy absorber 40 to achieve a desired response. For example, the energy absorber 40 may be tuned (i.e., its characteristics manipulated and designed) to complement, offset and/or compensate for certain characteristics and boundary conditions (e.g., surface geometry, hardness, stiffness and/or other properties) presented by the covered object 50 with which the energy absorber 40 may be used. FIG. 9-1 shows an example of a covered object 50 which has a face 51 with which the energy absorber 40 may interface. The face 51 of the covered object 50 includes two or more regions or areas among which certain mechanical, geometric or other properties vary. For instance, the face 51 may include one or more brackets 52 (e.g., made of a hard metal) having some portion thereof on the face 51 of the covered object 50 and some portion on one side 53 of the covered object 50. Each of these brackets 52 may have a respective hardness, stiffness, surface geometry and the like. The face 51 may also include one or more "softer" regions or areas such as a flex circuit 54 (e.g., made of plastic or elastomeric material) having a portion thereof on the face 51 and a portion running down another side 55 of the covered object 50. The face 51 may also include other features, such as the circular areas 56 which may be slightly raised above the overall surface 51 of the covered object 50, or slightly indented into or below this overall surface or face 51. These features 52, 54, 56 are merely examples, but they represent areas or regions across the face 51 of the covered object 50 which contribute to the variation of certain properties (e.g., hardness, stiffness, surface geometry) across the face 51 of the covered object 50. The "top" surfaces of these features 52, 54, 56, along with regions or areas of the face 51 where none of these features are present, collectively define a generally planar face 57 of the covered object 50 as shown in FIG. 9-2. This generally planar face 57 defines a collection or matrix 70 of cells 71 as shown in FIG. 9-3. Alternatively, the matrix 70 of cells 71 may be defined by the face 51 of the covered object 50 and the features 52, 54, 56 on the top surface or face 51. Although FIG. 9-3 shows a rectangular matrix 70 which is 7 cells long and 4 cells wide made of cells 71 having the same cubic shape and size, this is for illustration purposes, as the matrix 70 may comprise any number of cells, in any combination of shapes and sizes. For example, the cells may be sized, shaped and arranged so as to generally correspond to the geometries of the features 52, 54, 56 shown in FIG. 9-1, or they may be otherwise sized, shaped and arranged.

Thus, a face or surface 51, 57 of a covered object 50 may be characterized as a matrix 70 of cells or areas 71, each having respective properties and/or boundary conditions which vary (e.g., from cell to cell, or from area to area) across the matrix 70. These properties include a hardness (e.g., a Brinell, Vickers or Rockwell C hardness), a stiffness (e.g., Young's modulus), an elastoplasticity and a surface geometry for each cell 71, with one or more of these properties varying across at least one direction across the matrix 70. For the sake of clarity, "elastoplasticity" refers to how a cell, area or feature (including the material(s) used therefor) responds to stress and/or impulse, as demonstrated by how the cell, area or feature transitions from elastic deformation to yield point to plastic deformation to fracture/failure, and at what points or levels those transitions occur. After the covered object 50 has been characterized as a matrix 70 of areas or cells 71 whose properties vary across the matrix 70, a corresponding matrix 72 may be generated for the energy absorber 40. This matrix 72 comprises a collection of cells 73 which also have properties which may vary across the matrix 72. The variation of these properties for this particular matrix 72 of cells 73 for the energy absorber 40 may be very different from, but complementary to, the variation of properties for the matrix 70 of cells 71 for the covered object 50, in order to achieve a desired or targeted response 74 for each cell.

FIG. 10 indicates that each of the cells or areas 73 of the energy absorber matrix 72 is tuned such that an impulsing object 85 experiences a desired or targeted deceleration vs. time response 74 during a collision with the cover 30 in the area of the cover 30 under which the energy absorber 40 is disposed between the cover 30 and the covered object 50. This response 74 may be uniform across all the cells or areas 73 of the matrix 72; that is, when an object 85 impulses the cover 30 in the area under which the energy absorber 40 is disposed between the cover 30 and the covered object 50, the impulsing object 85 would experience the same deceleration vs. time response 74 at any point within this area. This is because the properties of the energy absorber 40 have been tuned or selected to complement the properties of the covered object 50 (and optionally the cover 30 as well) so as to provide this uniform response 74 across this area.

Figure 11:
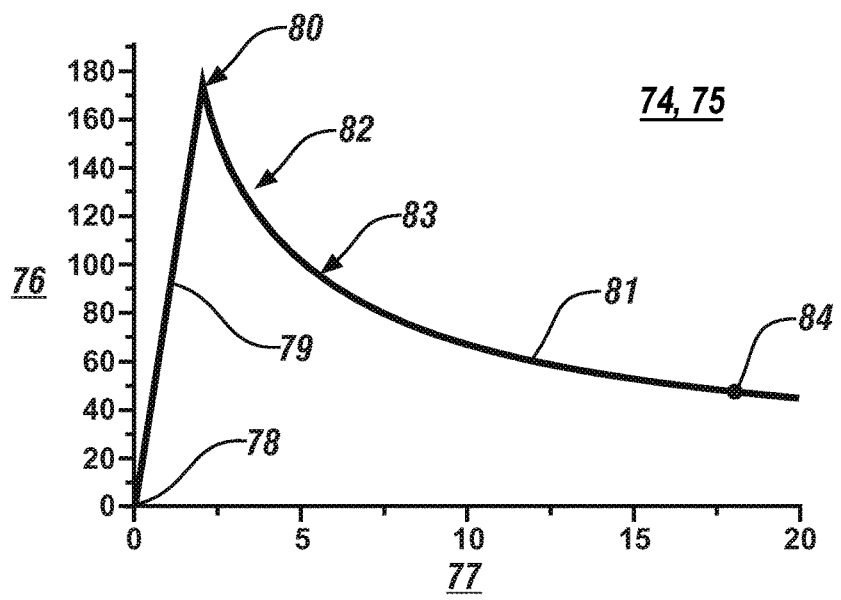
FIG. 11 shows a deceleration vs. time plot according to an embodiment of the disclosure.
Figure 12:
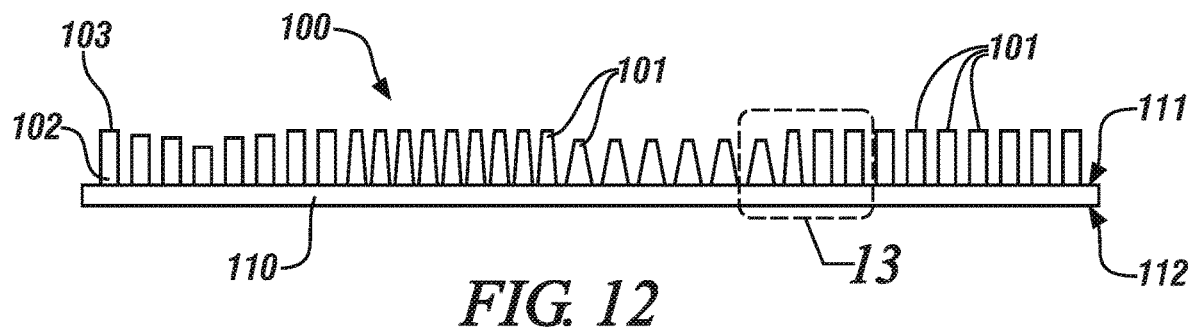
FIG. 12 shows a schematic side view of an arrangement of micro-elements according to an embodiment of the disclosure.
Figure 13:
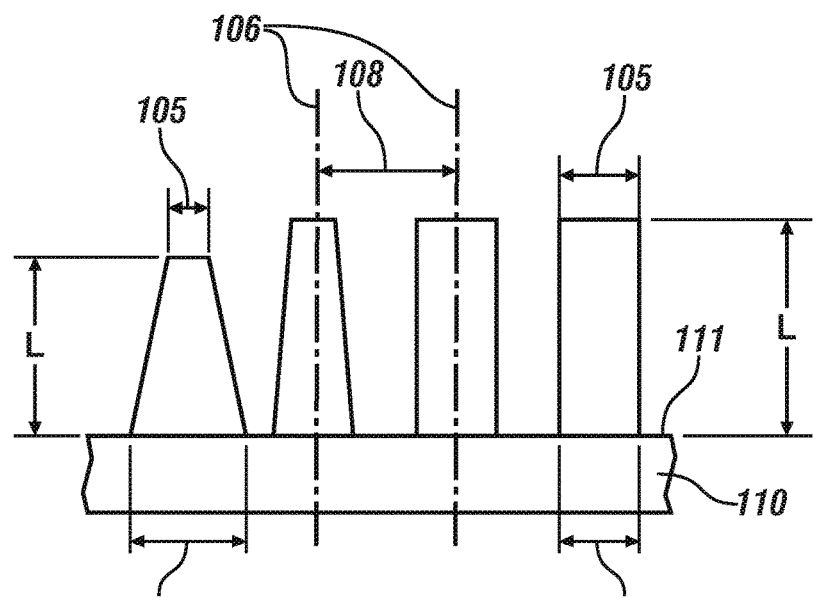
FIG. 13 shows a close-up of a portion of the micro-elements shown in FIG. 12 according to an embodiment of the disclosure.

FIG. 11 illustrates the desired or targeted deceleration vs. time response 74 as experienced by the impulsing object 85 (i.e., its deceleration over time). The vertical axis 76 represents the deceleration (e.g., measured in units of g) and the horizontal axis 77 represents time (measured in milliseconds, ms). The plot 81 in FIG. 11 begins when the object 85 has impulsed the cover 30 and any gap 39 has been closed such that the cover 30, energy absorber 40 and covered object 50 are "sandwiched" together with substantially no space or gap 39 intervening between them, thereby defining the beginning of the impulse event. Thus, if there is no initial gap 39, meaning the cover 30, energy absorber 40 and covered object 50 are already sandwiched together when the impulsing object 85 collides with the cover 30, then the impulse event and the plot 81 of FIG. 11 would begin substantially at the moment the object 85 contacts the cover 30. However, if there is an initial gap 39, then the impulse event and the plot 81 in FIG. 11 would begin once the gap 39 has been collapsed and the cover 30, energy absorber 40 and covered object 50 are sandwiched together, which may be a few milliseconds after the object 85 makes initial contact with the cover 30.

The plot 81 for the deceleration vs. time profile 74 begins at an initial deceleration 78 (e.g., zero g) and rises in a generally linear manner to a peak deceleration 80 within about 5 ms after the beginning 78 of the impulse event. This generally linear portion 79 of the deceleration vs. time profile 74 corresponds to a region of elastic behavior, and is followed after the peak 80 (i.e., the yield point) by a generally non-linear region of crushing 82 and fracture/failure 83 (in the energy absorber 40) during which the deceleration is decreasing. The peak 80 corresponds to a yield point where the response curve 74 transitions from substantially elastic behavior to substantially plastic behavior. The non-linear portion 82, 83 occurs over a period of not greater than 15 ms to a final target deceleration 84 of not greater than 10% of the peak deceleration 80. FIG. 11 may be viewed as the deceleration vs. time response 74 for the object 85 associated with each individual cell or area 73 of the energy absorber matrix 72, as well as the deceleration vs. time response 75 for the object 85 associated with the entire energy absorber 40 and any point on the absorber 40. It has been determined that providing an energy absorber 40 tuned to complement the properties that vary across an associated hard covered object 50 so as to cause the desired deceleration vs. time response 74, 75 in an impulsing object 85 colliding with the associated cover 30 will translate into a desirable HIC score of 1000 or less.

It has also been determined that favorable results may be achieved by tuning each cell 73 so that it includes a respective plurality of generally elongate micro-elements interconnected to form a respective cell micro-structure, with each cell 73 having a respective energy absorption capacity, such that an energy absorption capacity of the energy absorber 40 varies across at least one of the in-plane and out-of-plane directions. Each micro-element has a respective micro-element configuration (i.e., a collection of properties for that micro-element) comprising a respective length L, overall thickness, shape, material composition, density and porosity of the micro-element, wherein the micro-element configurations vary across at least one of the in-plane and out-of-plane directions associated with the energy absorber 40. A micro-element is described as "elongate" to mean that its length L is larger than its overall thickness or width. The cell micro-structure for each cell 73 refers to the structure or arrangement of discrete, individuated, elongate micro-elements within that cell 73, and how the micro-elements are interconnected with each other within the cell 73.

The cell micro-structure of each cell 73 may be disposed in either of two different arrangements or configurations. In a first arrangement 100 as shown in FIGS. 12 through 17, each micro-element in the cell 73 may be a generally elongate pillar member 101, each having a respective base end 102 having a base width 104, and a free end 103 having an end width 105. The first arrangement 100 further includes a generally planar substrate 110 having opposed first and second generally planar surfaces 111, 112, wherein the base end 102 of each pillar member 101 is contiguous with the first generally planar surface 111 of the substrate 110. The cell micro-structure of each cell 73 may also be configured in a second arrangement 130, which will be described below.

The pillar members 101 and substrate 110 of the first arrangement 100 may be produced by 3D printing or other additive manufacturing processes. The material composition of each pillar member 101 may be a metal alloy, a polymer and/or a ceramic. For example, the material composition may include an aluminum alloy, a magnesium alloy, a titanium alloy, a copper alloy, a steel alloy, or a combination of these and other alloys, such as AlSi10Mg, Ti6Al4V, 4140 steel and various stainless steels. Alternatively, the material composition of each pillar member 101 may include a ceramic (e.g., alumina), a thermoplastic material (e.g., polyetheretherketone (PEEK), polyetherketoneketone (PEKK), polyaryletherketone (PAEK)), a thermoset material, an elastomeric material or other suitable material. Each pillar member 101 may have a longitudinal axis 106 extending centrally along the length L of the pillar member 101, and a longitudinal axis-to-longitudinal axis spacing or pitch 108 which is the distance from the longitudinal axis 106 of the pillar member 101 to the longitudinal axis 106 of its closest neighboring pillar member 101. Each pillar member 101 has a cross-sectional area or shape, transverse to the pillar member's longitudinal axis 106, which may be circular, square, rectangular, hexagonal, C-shaped or other suitable shape, with the cross-sectional area or shape optionally varying along the length L of the pillar member 101 (i.e., along the direction of the longitudinal axis 106). Thus, the pillar members 101 may assume the form of rods, cones, frustums, and so forth.

Figures 1, 14:
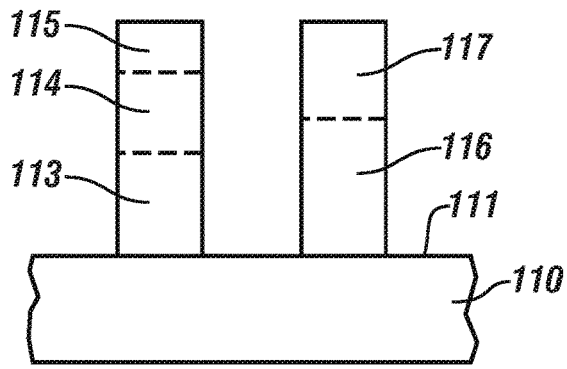
Figures 2, 14:
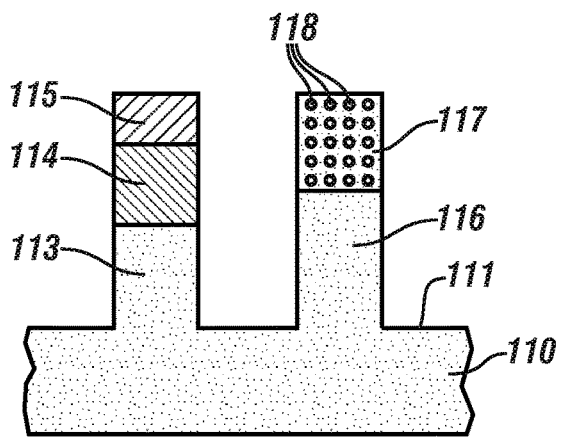

As illustrated schematically in FIGS. 14-1 and 14-2, each pillar member 101 may have two or more portions having material composition and/or other properties which vary from portion to portion. For example, a pillar member 101 may have a first portion 113 made of a first material, a second portion 114 made of a second material and a third portion 115 made of a third material. As another example, a pillar member 101 may have a fourth portion 117 having pores or voids 118 therein, and a fifth portion 116 having no pores or voids 118. As shown in FIG. 14-2, the first material of the first portion 113 and fifth portion 116 may be the same as the material used for the substrate 110. The pores 118 may be intentionally distributed throughout some or all of one or more pillar members 101 in order to tailor the crush response of the pillar member(s) 101 as needed to achieve the desired deceleration vs. time response 74, 75 and the desired HIC score.

Figures 1, 15:
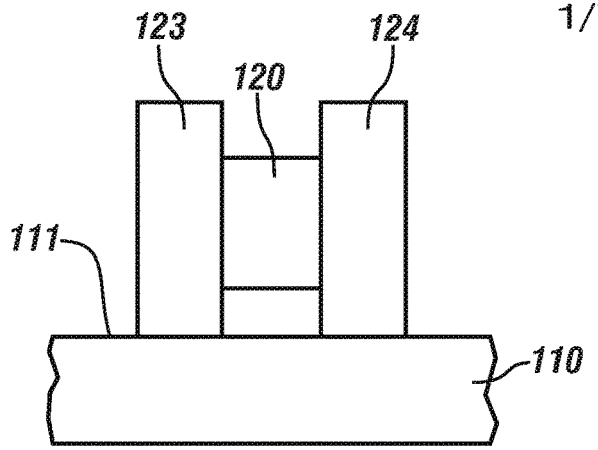
Figures 2, 15:
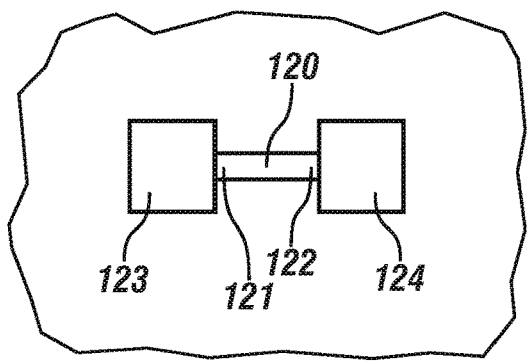
Figures 1, 16:
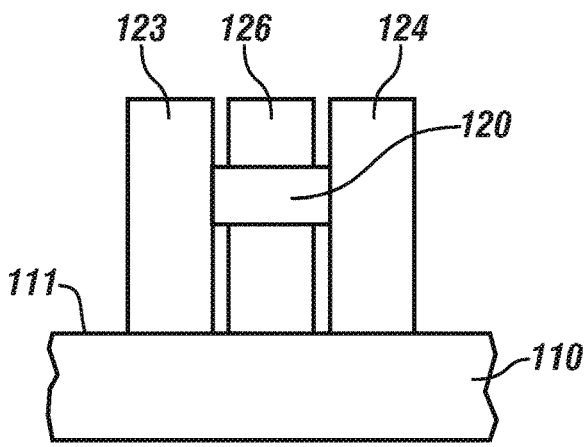
Figures 2, 16:
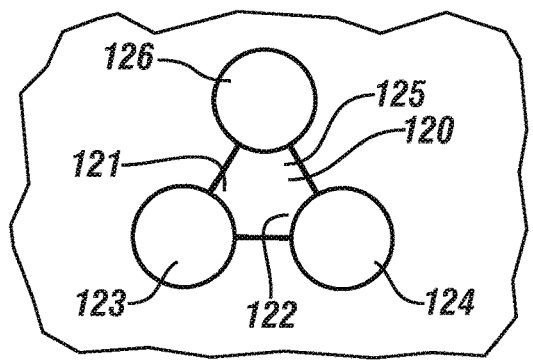

As shown schematically in FIGS. 15-1 and 15-2, the first arrangement or configuration 100 of pillar members 101 may also include one or more cross-members 120, each connected with at least two neighboring pillar members 101. For example, cross-member 120 may have a first end 121 attached to a first adjacent pillar member 123 and a second end 122 attached to a second adjacent pillar member 124. Likewise, in FIGS. 16-1 and 16-2, a cross-member 120 may have a first end 121 attached to a first adjacent pillar member 123, a second end 122 attached to a second adjacent pillar member 124, and a third end 125 attached to a third adjacent pillar member 126. The material composition of each cross-member 120 may be tuned or selected as needed to favorably contribute toward the desired or targeted deceleration vs. time response 74, 75 and HIC score.

Figures 1, 17:
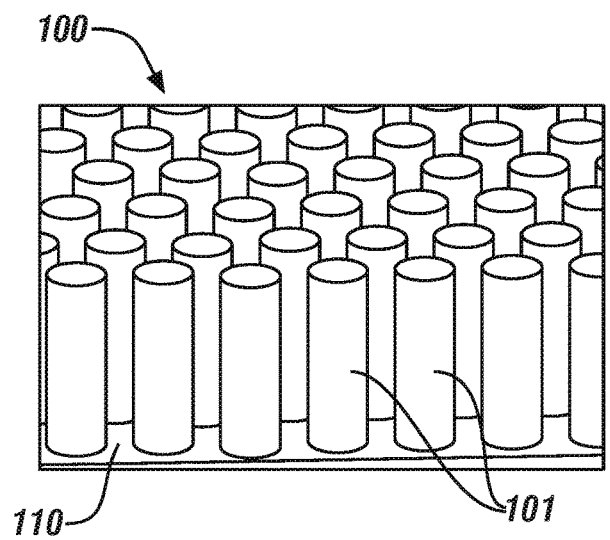
Figures 2, 17:
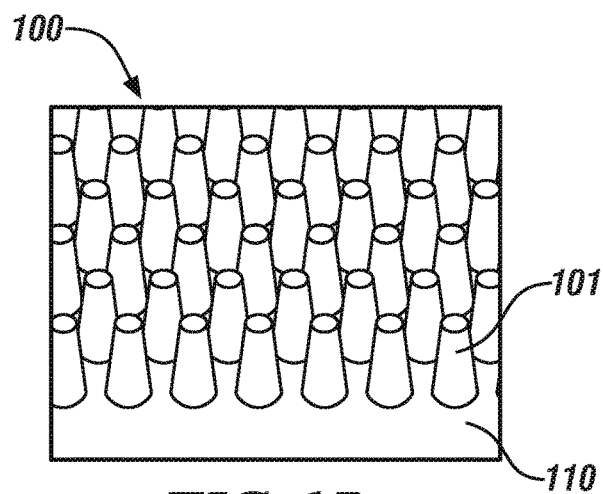
Figures 3, 17:
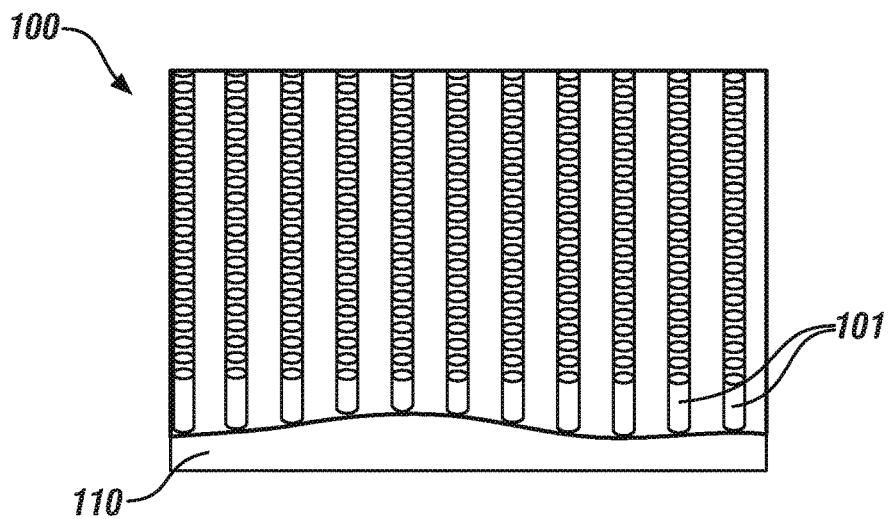

FIGS. 17-1, 17-2 and 17-3 show views of various pillar members 101 and substrate 110 according to the present disclosure. Note that the pillar members 101 may be aligned in straight rows and columns as shown in FIG. 17-3, or interleaved and staggered as shown in FIGS. 17-1 and 17-2. The pillar members 101 may also be arrayed in other formations as well. Note that the substrate 110 may have a surface which is generally flat as shown in FIGS. 17-1 and 17-2, or it may undulate as shown in FIG. 17-3. The lengths and other material, mechanical and geometric properties of the pillar members 101, as well as the thickness and other material, mechanical and geometric properties of the substrate 110, may be tuned and varied across one or more directions of the energy absorber 40 (e.g., from cell to cell or area to area) so as to complement the properties of the covered object 50, to achieve the desired deceleration vs. time response 74, 75 and HIC score for an object 85 colliding with the cover 30 with the energy absorber 40 interposed between the cover 30 and covered object 50.

Figure 18:
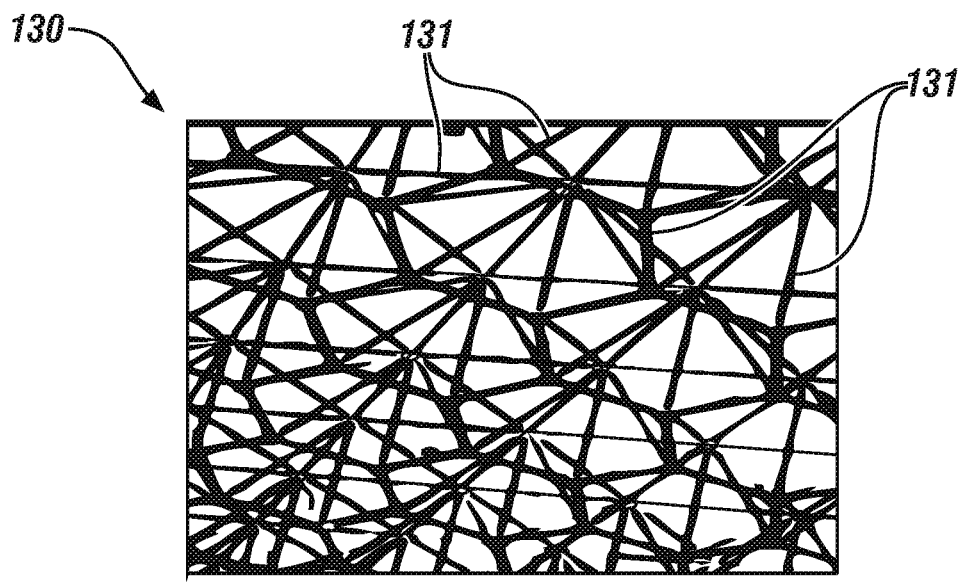
FIG. 18 shows a 3D lattice formed of truss member micro-elements according to an embodiment of the disclosure.
Figures 1, 19:
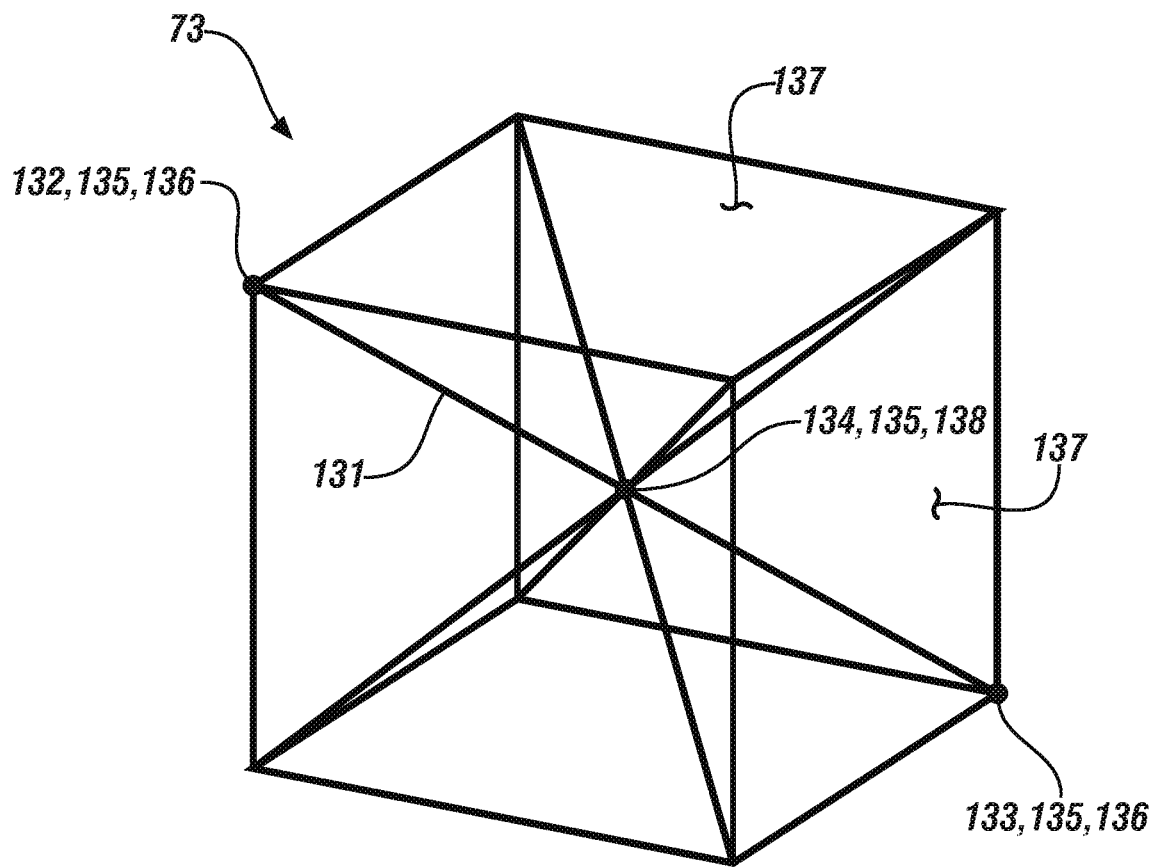
Figures 2, 19:
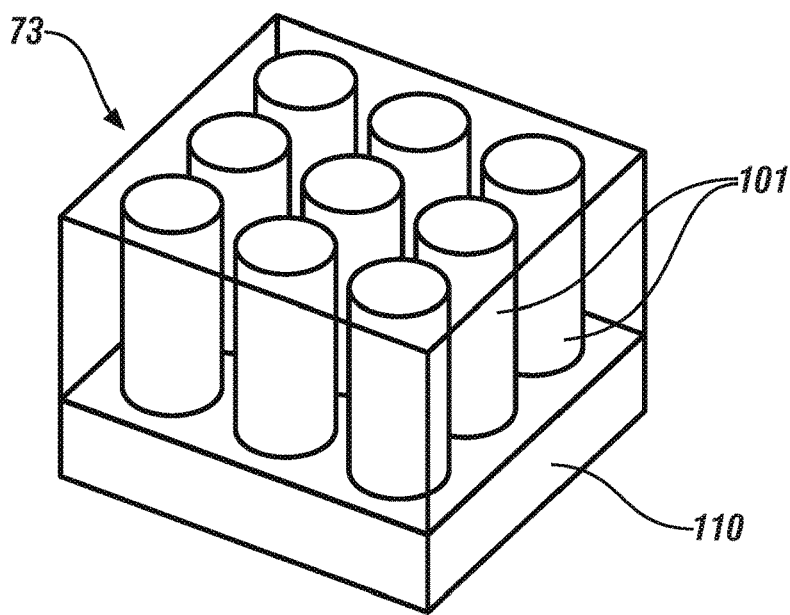

FIGS. 18 and 19-1 illustrate a second arrangement 130, in which the cell micro-structure of a cell 73 may generally take the form of a 3D lattice wherein each micro-element in the arrangement 130 may be a generally elongate truss member 131. Each truss member 131 has first end 132 and a second end 133, with each truss member 131 being directly connected to at least one other truss member 131. Each truss member 131 has at least one connection locus 135, with each connection locus 135 being located at the first end 132, the second end 133, or at one or more points 134 between the first and second ends 132, 133. Each truss member 131 is connected at each of its connection loci 135 to at least one other truss member 131. Thus, a given truss member 131 may have one, two or three connection loci 135 (or perhaps more), and at each connection locus 135 the truss member 131 may be connected to one or more other truss members 131, thereby forming a 3D lattice type of structure.

Since the truss members 131 of the second arrangement 130 form a 3D lattice in which the truss members 131 are directly interconnected with each other, no substrate 110 is needed for the 3D lattice. Like the pillar members 101 of the first arrangement 100, the truss members 131 may be manufactured by 3D printing or other additive manufacturing processes, and the material composition of the truss members 131 may include a metal alloy, a polymer and/or a ceramic, similar to the material composition of the pillar members 101 discussed above. FIG. 18 shows an example of the second arrangement 130 in which a 3D lattice is formed using truss members 131 forming hexagonal and other structures.

FIG. 19-1 shows a representation of a cell 73 utilizing the second arrangement 130 of micro-elements, in the form of interconnected truss members 131. In this arrangement 130, four elongate interconnected truss members 131 are shown. Each truss member 131 has a first end 132, a second end 133, and a point 134 between the first and second ends 132, 133. The first end, 132, second end 133 and middle point 134 are connection loci 135 as well, and the four truss members 131 are interconnected at their respective middle points 134. This common connection point is indicated by point 138, which also coincides with the middle point 134 and middle connection locus 135 for each of the four truss members 131. Each of the corners 136 of the cell 73 coincides with either the first end 132 or second end 133 of a truss member 131. The cell 73 also has multiple walls or faces 137; as shown in FIG. 19-1, a generally cubic cell 73 would have eight corners 136 and six faces 137. However, each cell 73 of the energy absorber matrix 72 may be sized and shaped differently and independently as compared to other cells 73.

FIG. 19-2 shows a cell 73 according to the first arrangement 100, in which pillar members 101 and a substrate 110 are used. The pillar members 101 of the first arrangement 100 and the truss members 131 of the second arrangement 130 may be tuned (e.g., designed and manufactured) such that the material composition, the density, the shape and/or the porosity of each micro-element 101, 131 varies along the length L of the micro-element 101, 131. Each of the micro-elements 101, 131 may be solid—that is, generally not hollow—yet may have pores or voids 118 distributed throughout some portion or all of the micro-element 101, 131. The degree of porosity (i.e., pore 118 distribution) throughout each micro-element 101, 131 may be between 0% and 40% by volume. For each cell or area 73 of the energy absorber 40, the plurality of micro-elements 101, 131 in the cell 73 may have a collective volume which takes up 20-60% of the overall cell volume. (I.e., 40-80% of each cell 73 may be empty space.)

Figure 20:
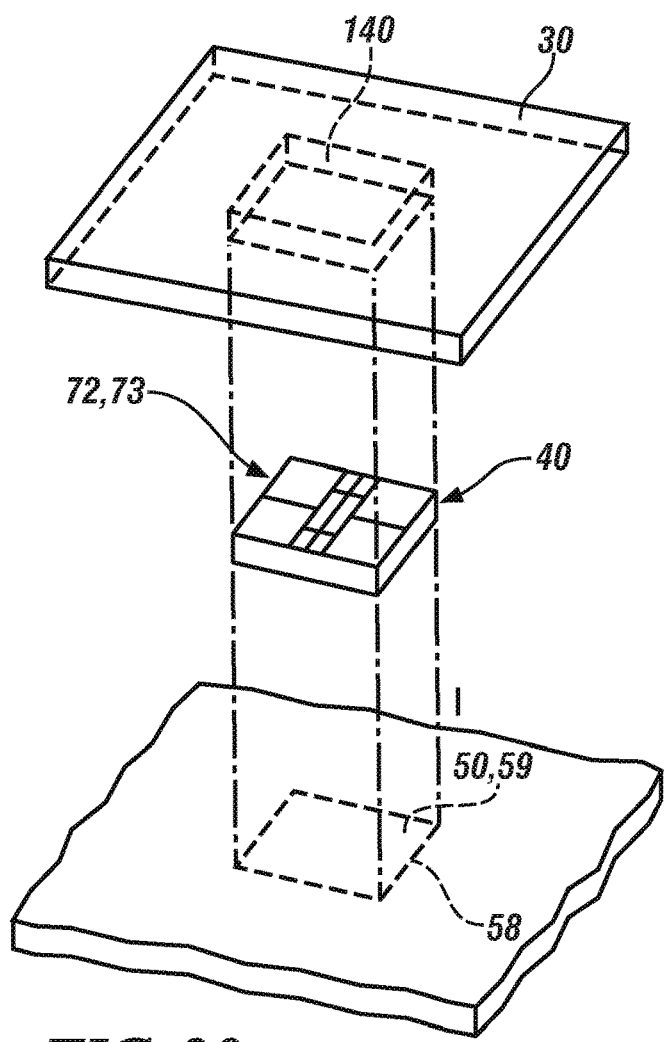
FIG. 20 shows a schematic perspective view of a cover, energy absorber and covered object with respective projected areas and volumes according to an embodiment of the disclosure.

FIG. 20 shows a schematic perspective view representation of the cover 30, tunable energy absorber 40 and covered object 50. The covered object 50 may have a perimeter 58 defining an area or region 59 within the perimeter 58. In this area 59, a variety of different sub-areas (not shown) may have respective different properties such as hardness, stiffness, elastoplasticity and surface geometry. An energy absorber 40 may be designed with various cells or areas 73, collectively forming a matrix or collection 72 of cells 73, which may be positioned above the area or region 59 of the covered object 50, and may generally fit within the projected perimeter 58 of the covered object 50. The perimeter 58 of the covered object 50 may also be projected onto the underside surface of the cover 30, as indicated by the dashed lines of the cover 30. This projection may be seen as forming a volume 140 within the cover 30, and an area on the top surface of the cover 30, at which the deceleration vs. time response of an impulsing object 85 (not shown), and the resulting HIC score, may be measured.

After characterizing the variations of the properties across the face 51 of the covered object 50 as a first matrix 70 of cells or areas 71, designers may then use artificial intelligence (AI) and/or machine learning (ML) approaches and algorithms to develop an optimized model of a corresponding second matrix 72 of cells 73 representative of the energy absorber 40 which accomplishes the desired or targeted deceleration vs. time response and HIC score for an impulsing object 85. This matrix 72 of cells 73 for the energy absorber 40 may correspond spatially to the matrix 70 of cells 71 for the covered object 50. Using the two arrangements 100, 130 with respective pillar members 101 and truss members 131, the AI/ML algorithm may determine the best fit of arrangements 100, 130 (i.e., pillar members 101 and/or truss members 131) and properties (e.g., length, overall width, material composition, etc.) for each cell 73 and for achieving a generally uniform response 74, 75 and desirably low HIC score for the impulsing object 85 across multiple directions across the energy absorber 40 (and therefore across the corresponding surface/area of the cover 30). For example, for some cells 73, the AI/ML algorithm may determine that pillar members 101 are the optimum type of micro-element and cell micro-structure to use, while for other cells the AI/ML algorithm may determine that truss members 131 are the optimum type of micro-element and cell micro-structure, while other cells 73 utilize a combination of these arrangements 100, 130 and micro-elements 101, 131. With this process, an energy absorber 40 may be designed which is suitable for a given covered object 50 (and cover 30) which achieves the desired deceleration vs. time response and HIC score for an object 85 impulsing an area or volume 140 of the cover 30 adjacent to the location of the energy absorber 40.

The above description is intended to be illustrative, and not restrictive. While various specific embodiments have been presented, those skilled in the art will recognize that the disclosure can be practiced with various modifications within the spirit and scope of the claims. While the dimensions and types of materials described herein are intended to be illustrative, they are by no means limiting and are exemplary embodiments. Moreover, in the following claims, use of the terms "first", "second", "top", "bottom", etc. are used merely as labels, and are not intended to impose numerical or positional requirements on their objects. Further, the limitations of the following claims are not written in means-plus-function or step-plus-function format and are not intended to be interpreted as such, unless and until such claim limitations expressly use the phrase "means for" or "step for" followed by a statement of function void of further structure. As used herein, an element or step recited in the singular and preceded by the word "a" or "an" should be understood as not excluding plural of such elements or steps, unless such exclusion is explicitly stated. Furthermore, references to a particular embodiment or example are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, such as in the phrase "substantially circular" or "generally circular", these adverbs mean "for the most part", "to a significant extent" and/or "to a large degree", and do not necessarily mean "perfectly", "completely", "strictly" or "entirely". For example, a "substantially circular shape" can include one or more of the following: a perfect circle; an ellipse whose major and minor axes have lengths within about 10% of each other; an undulatory shape that has an overall circular or nearly circular elliptical shape; and a foregoing shape whose perimeter, in whole or in part, includes deviations inward and/or outward from the overall circular, nearly circular elliptical or undulatory shape.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An energy absorber for interposition between a cover and a covered object, comprising:
a generally planar matrix of cells, the matrix of cells defining in-plane and out-of-plane directions, each cell of the matrix of cells comprising a respective plurality of generally elongate micro-elements interconnected to form a respective cell micro-structure, each cell of the matrix of cells having a respective energy absorption capacity wherein an energy absorption capacity of the energy absorber varies across at least one of the in-plane and out-of-plane directions,
wherein the matrix of cells when subject to an impulse of an object with the cover with the energy absorber sandwiched between the cover and the covered object, thereby defining an impulse event, causes a deceleration vs. time response in the object, beginning with a generally linear rise in the deceleration from an initial deceleration at a beginning of the impulse event to a peak deceleration within 5 ms after the beginning of the impulse event, followed by a generally nonlinear decrease in the deceleration over a period of not greater than 15 ms to a final target deceleration of not greater than 10% of the peak deceleration, and
wherein each micro-element of the respective plurality of generally elongate micro-elements has a collection of properties including a length, overall thickness, shape, material composition, density and porosity defining a respective micro-element configuration of the each micro-element, wherein the respective micro-element configuration varies across at least one of the in-plane and out-of-plane directions.

2. The energy absorber according to claim 1, wherein the material composition includes at least one of a metal alloy, a polymer and a ceramic.

3. The energy absorber according to claim 1, wherein at least one of the material composition, density and porosity of a respective micro-element of the respective plurality of generally elongate micro-elements varies along the length of the respective micro-element.

4. The energy absorber according to claim 1, wherein the respective cell micro-structure is disposed in one of:
 a first arrangement wherein each micro-element of the respective plurality of generally elongate micro-elements therein comprises a generally elongate pillar member, each pillar member having a respective base end and free end, and further comprising a generally planar substrate having opposed first and second generally planar surfaces, wherein the base end of each pillar member is contiguous with the first generally planar surface of the substrate; and
 a second arrangement comprising a 3D lattice wherein the each micro-element therein comprises a generally elongate truss member, each truss member having a respective first end and second end, wherein each respective truss member is directly connected to at least one other respective truss member.

5. The energy absorber according to claim 4, wherein the first arrangement further comprises at least one cross-member connected with at least two pillar members.

6. The energy absorber according to claim 4, wherein in the second arrangement, the each truss member therein has at least one connection locus, each connection locus of the at least one connection locus being located at one of the first end, the second end and a point between the first and second ends, the each truss member therein being connected at each of its respective at least one connection locus to at least one other respective truss member.

7. The energy absorber according to claim 1, wherein each micro-element of the respective plurality of generally elongate micro-elements is generally solid and has a porosity between 0% and 40% by volume.

8. The energy absorber according to claim 1, wherein for each cell of the matrix of cells, the respective plurality of generally elongate micro-elements therein has a volume comprising 20-60% of a cell volume.

9. The energy absorber according to claim 1, wherein the covered object has a generally planar face and wherein at least one of a hardness, stiffness, elastoplasticity and surface geometry of the covered object varies across the face of the covered object.

10. A tuned energy absorber for interposition between a cover and a covered object, the covered object having a generally planar face defining a first matrix of cells, each cell of the first matrix of cells having a respective hardness, stiffness, elastoplasticity and surface geometry wherein at least one of the hardness, stiffness, elastoplasticity and surface geometry varies across the generally planar face, the energy absorber comprising:
 a generally planar second matrix of cells corresponding to the first matrix of cells, the second matrix of cells defining in-plane and out-of-plane directions, each cell of the second matrix of cells comprising a respective plurality of generally elongate, generally solid micro-elements interconnected to form a respective cell micro-structure, each cell of the second matrix of cells having a respective energy absorption capacity wherein an energy absorption capacity of the energy absorber varies across at least one of the in-plane and out-of-plane directions,
 wherein the generally planar second matrix of cells when subject to an impulse of an object with the cover with the energy absorber sandwiched between the cover and the covered object, thereby defining an impulse event, causes a deceleration vs. time response in the object, beginning with a generally linear rise in the deceleration from an initial deceleration at a beginning of the impulse event to a peak deceleration within 5 ms after the beginning of the impulse event, followed by a generally nonlinear decrease in the deceleration over a period of not greater than 15 ms to a final target deceleration of not greater than 10% of the peak deceleration,
 wherein each micro-element of the respective plurality of generally elongate, generally solid micro-elements has a collection of properties including a length, overall thickness, shape, material composition, density and porosity defining a respective micro-element configuration of the each micro-element, wherein the respective micro-element configuration varies across at least one of the in-plane and out-of-plane directions.

11. The tuned energy absorber according to claim 10, wherein the respective cell micro-structure is disposed in one of:
 a first arrangement wherein each micro-element of the respective plurality of generally elongate, generally solid micro-elements therein comprises a generally elongate pillar member, each pillar member having a respective base end and free end, and further comprising a generally planar substrate having opposed first and second generally planar surfaces, wherein the base end of each pillar member is contiguous with the first generally planar surface of the substrate; and
 a second arrangement comprising a 3D lattice wherein the each micro-element therein comprises a generally elongate truss member each truss member having a respective first end and second end, wherein each respective truss member is directly connected to at least one other respective truss member.

12. The tuned energy absorber according to claim 11, wherein the first arrangement further comprises at least one cross-member connected with at least two pillar members.

13. The tuned energy absorber according to claim 11, wherein in the second arrangement, each truss member therein has at least one connection locus, each connection locus of the at least one connection locus being located at one of the first end, the second end and a point between the first and second ends, the each truss member therein being connected at each of its respective at least one connection locus to at least one other respective truss member.

14. An energy absorber system, comprising:
 a covered object having a generally planar face defining a first matrix of cells, each cell of the first matrix of cells having a respective hardness, stiffness, elastoplasticity and surface geometry, wherein at least one of the hardness, stiffness, elastoplasticity and surface geometry varies across the generally planar face;
 a cover spaced apart from and covering the generally planar face of the covered object; and
 an energy absorber interposed between the cover and the covered object, the energy absorber comprising a generally planar second matrix of cells corresponding to the first matrix of cells, the second matrix of cells defining in-plane and out-of-plane directions, each cell of the second matrix of cells comprising a respective plurality of generally elongate micro-elements interconnected to form a respective cell micro-structure, each cell of the second matrix of cells having a respective energy absorption capacity wherein an energy absorption capacity of the energy absorber varies across at least one of the in-plane and out-of-plane directions;

wherein the generally planar second matrix of cells when subject to an impulse of an object with the cover with the energy absorber sandwiched between the cover and the covered object, thereby defining an impulse event, causes a deceleration vs. time response in the object, beginning with a generally linear rise in the deceleration from an initial deceleration at a beginning of the impulse event to a peak deceleration within 5 ms after the beginning of the impulse event, followed by a generally nonlinear decrease in the deceleration over a period of not greater than 15 ms to a final target deceleration of not greater than 10% of the peak deceleration, and wherein each micro-element of the respective plurality of generally elongate micro-element has a collection of properties including a length, overall thickness, shape, material composition, density and porosity defining a respective micro-element configuration of the each micro-element, wherein the respective micro-element configuration varies across at least one of the in-plane and out-of-plane directions.

15. The energy absorber system according to claim 14, wherein at least one of the material composition, density and porosity of a respective micro-element of the respective plurality of generally elongate micro-elements varies along the length of the respective micro-element.

16. The energy absorber system according to claim 14, wherein each the respective cell micro-structure is disposed in one of:
    a first arrangement wherein each micro-element of the respective plurality of generally elongate micro-elements therein comprises a generally elongate pillar member, each pillar member having a respective base end and free end, and further comprising a generally planar substrate having opposed first and second generally planar surfaces, wherein the base end of each pillar member is contiguous with the first generally planar surface of the substrate; and
    a second arrangement comprising a 3D lattice wherein the each micro-element therein comprises a generally elongate truss member, each truss member having a respective first end and second end, wherein each respective truss member is directly connected to at least one other respective truss member.

17. The energy absorber system according to claim 14, wherein each micro-element of the respective plurality of generally elongate micro-elements is generally solid and has a porosity between 0% and 40% by volume.

* * * * *